(12) United States Patent
Townend et al.

(10) Patent No.: US 11,140,006 B2
(45) Date of Patent: Oct. 5, 2021

(54) METHOD OF OPERATING A NETWORK NODE

(71) Applicant: BRITISH TELECOMMUNICATIONS PUBLIC LIMITED COMPANY, London (GB)

(72) Inventors: David Townend, London (GB); Malcolm Hubert, London (GB); Keith Briggs, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/733,154

(22) PCT Filed: Oct. 15, 2018

(86) PCT No.: PCT/EP2018/077994
§ 371 (c)(1),
(2) Date: May 29, 2020

(87) PCT Pub. No.: WO2019/105642
PCT Pub. Date: Jun. 6, 2019

(65) Prior Publication Data
US 2020/0396104 A1    Dec. 17, 2020

(30) Foreign Application Priority Data

Nov. 29, 2017  (EP) ..................... 17204273

(51) Int. Cl.
*H04L 12/54*  (2013.01)
*H04L 12/28*  (2006.01)
(Continued)

(52) U.S. Cl.
CPC ...... *H04L 12/5692* (2013.01); *H04L 12/2898* (2013.01); *H04L 41/5009* (2013.01); *H04L 41/5025* (2013.01); *H04W 88/06* (2013.01)

(58) Field of Classification Search
CPC . H04L 12/24; H04L 12/2419; H04L 12/2898; H04L 12/5009; H04L 12/5692;
(Continued)

(56) References Cited

U.S. PATENT DOCUMENTS 5,923,247 A  7/1999  Dowden
6,018,300 A  1/2000  Dowden
(Continued)

FOREIGN PATENT DOCUMENTS

| CN | 1658578 A | 8/2005 |
| CN | 105850182 A | 8/2016 |
| WO | WO 2016115409 | 7/2016 |

OTHER PUBLICATIONS

Great Britain Search Report, Application No. GB1718901.1, dated May 23, 2018, 6 pages.
(Continued)

*Primary Examiner* — Melanie Jagannathan
(74) *Attorney, Agent, or Firm* — Patterson Thuente Pedersen, P.A.

(57) ABSTRACT

This disclosure provides a network node, and a method of operating the network node, having one or more communications interfaces connectable to a first communications network and to a second communications network, the method including the network node accessing a service using the first communications network; analyzing data relating to the first communications network to identify a plurality of fault-indicative events; determining a rate of the plurality of fault-indicative events per unit time; and the network node accessing the service using the second communications network in response to a first trigger, wherein the first trigger is based on the rate of the plurality of fault-indicative events per unit time.

15 Claims, 3 Drawing Sheets

(51) Int. Cl.
*H04L 12/24* (2006.01)
*H04W 88/06* (2009.01)

(58) Field of Classification Search
CPC . H04L 41/0663; H04L 41/5009; H04W 88/06
See application file for complete search history.

(56) References Cited

U.S. PATENT DOCUMENTS

| | | | |
|---|---|---|---|
| 7,590,055 | B2 | 9/2009 | Segel |
| 7,606,145 | B2 | 10/2009 | Wang |
| 7,769,021 | B1 | 8/2010 | Chen |
| 8,094,679 | B2 | 1/2012 | King |
| 8,599,811 | B2 | 12/2013 | Zhang |
| 9,438,471 | B1* | 9/2016 | Amdahl ............... H04L 43/0817 |
| 10,616,347 | B1* | 4/2020 | Van Oort ................ H04L 45/70 |
| 2002/0126635 | A1 | 9/2002 | Sugiyama |
| 2003/0120983 | A1 | 6/2003 | Vieregge |
| 2005/0138462 | A1* | 6/2005 | Hunt ..................... H04L 1/1685 714/4.4 |
| 2005/0249124 | A1* | 11/2005 | Elie-Dit-Cosaque ........................ H04L 41/0677 370/242 |
| 2006/0029105 | A1* | 2/2006 | Kasztenny ........ H02J 13/00034 370/503 |
| 2008/0052393 | A1* | 2/2008 | McNaughton ........ H04L 41/147 709/224 |
| 2008/0095049 | A1 | 4/2008 | Bugenhagen |
| 2008/0162981 | A1* | 7/2008 | Jajoo ..................... G06F 11/202 714/2 |
| 2008/0201468 | A1* | 8/2008 | Titus .................. H04L 43/0829 709/224 |
| 2009/0232008 | A1* | 9/2009 | Wurst ..................... H04L 41/26 370/245 |
| 2010/0149998 | A1* | 6/2010 | Schryer ............... H04L 43/0852 370/248 |
| 2011/0246833 | A1 | 10/2011 | Bockhaus |
| 2012/0113804 | A1 | 5/2012 | Zhang |
| 2014/0126356 | A1* | 5/2014 | Lee ..................... H04L 41/0663 370/228 |
| 2015/0003596 | A1 | 1/2015 | Croot |
| 2015/0326471 | A1 | 11/2015 | Anandan |
| 2016/0080248 | A1* | 3/2016 | Rijnders ............. H04L 41/5009 709/224 |
| 2016/0269932 | A1* | 9/2016 | Nemavat ................. H04L 47/25 |
| 2016/0286417 | A1 | 9/2016 | Joe |
| 2020/0351196 | A1* | 11/2020 | Curry ...................... H04L 45/22 |
| 2021/0045177 | A1* | 2/2021 | Lee ........................ H04W 76/18 |

OTHER PUBLICATIONS

International Search Report and Written Opinion, Application No. PCT/EP2018/077994, dated Nov. 20, 2018, 12 pages.
Anonymous, *User Guide NTC-30WV—3G Outdoor Wifi Router with Voice*, Jan. 1, 2014, pp. 1-160.
OpenWrt Wireless Freedom, *How to Use Multiple WAN Connections Using the MWAN3 Package*, 16 pages, Jul. 25, 2017.
European Extended Search Report, Application No. 17204273.1, dated Feb. 2, 2018, 16 pages.
Communication pursuant to Article 94(3) EPC for EP Application No. 18783041.9, dated Oct. 29, 2020, 4 pages.
Office Action For Chinese Application No. 201880076061.2, dated Jun. 3, 2021, 10 pages.

* cited by examiner

METHOD OF OPERATING A NETWORK NODE

PRIORITY CLAIM

The present application is a National Phase entry of PCT Application No. PCT/EP2018/077994, filed Oct. 15, 2018, which claims priority from EP Patent Application No. 17204273.1, filed Nov. 29, 2017, each of which is hereby fully incorporated herein by reference.

TECHNICAL FIELD

The present disclosure relates to a method of operating a network node in a telecommunications network.

BACKGROUND

A network node may be connectable to several telecommunications networks. An example is a Customer Premises Equipment (CPE) which is connectable to both a first access network via a first communications interface (e.g. a wired communications interface such as a Digital Subscriber Line (DSL) connection) and to a second access network via a second communications interface (e.g. a cellular communications interface such as a $4^{th}$ Generation (4G) Long Term Evolution (LTE) connection). Such CPEs are often known as "dual-mode" CPEs and may connect to external networks (e.g. the Internet) via either the first or second access network. Typically, the CPE connects to external networks via the wired access network, but may switch to the cellular access network if a trigger condition is met. This is often known as a "failover".

The dual-mode CPE is therefore a resilient product which allows the user to maintain a connection to the external network when the primary access network is in a fault state, and the dual-mode CPE may then reconnect via the primary access network when the fault has been rectified.

It is important that the CPE uses a suitable trigger condition for the failover to ensure that the CPE is not unnecessarily initiating a failover when it may be undesirable. In dual-mode CPEs that primarily use a DSL access network, the trigger condition is usually based on the loss of the physical and/or logical layers of the relevant communications protocol for a defined period of time. For example, if the first communications network uses a DSL connection, then the trigger condition may be based on the number of "retrain" events (when a DSL modem of the CPE reconfigures its connection with the corresponding DSL modem in the access node) occurring in a single 24-hour period exceeding a threshold value. If this threshold is set too high, then the failover may not be triggered despite the number of retrains being intolerable for the user; and if this threshold is set too low, then the failover may be triggered too often resulting in overuse of the backup access network (which typically have lower bandwidth, higher usage costs, and lower data allowances).

It is therefore desirable to alleviate some or all of the above problems.

SUMMARY

According to a first aspect of the disclosure, there is provided a method of operating a network node having a first communications interface connectable to a first communications network and a second communications interface connectable to a second communications network, the method comprising: the network node accessing a service using a connection to the first communications network; analyzing data relating to the first communications network to identify a plurality of fault-indicative events; determining a rate of the plurality of fault-indicative events per unit time; and the network node accessing the service using a connection to the second communications network in response to a first trigger, wherein the first trigger is based on the rate of the plurality of fault-indicative events per unit time.

Embodiments of the present disclosure provide the benefit that a failover threshold may be reactive to the rate of faults on the primary communications network, such that the failover threshold may be lowered if the rate of faults is unusually high. These periods of frequent faults are more frustrating and perceptible for the end-user, such that customer experience may be improved if the failover threshold is lowered at these times making it more likely to be triggered.

The method may further comprise: determining a first count of the plurality of fault-indicative events in a first time period; wherein the first trigger for the network node accessing the service using the second communications network is the first count of the plurality of fault-indicative events in the first time period satisfying a first threshold, wherein the first threshold is varied as a first function of the rate of the plurality of fault-indicative events per unit time.

The method may further comprise: following the network node accessing the service using the connection to the second communications network in response to the first trigger, the network node accessing the service using the first communications network in response to a second trigger, wherein the second trigger is based on the rate of the plurality of fault-indicative events per unit time.

The method may further comprise: determining a second count of the plurality of fault-indicative events in a second time period, wherein the second trigger for the network node accessing the service using the first communications network is the second count of the plurality of fault-indicative events satisfying a second threshold, wherein the second threshold is varied as a second function of the rate of the plurality of fault-indicative events per unit time.

The network node accessing the service using the second communications network may be in response to the first count of the plurality of fault-indicative events in the first time period being greater than the first threshold and the step of the network node accessing the service using the first communications network may be in response to the second count of the plurality of fault-indicative events in the second time period being less than the second threshold.

The first communications network may be a Digital Subscriber Line, DSL, access network, and the one or more communications interfaces may include a DSL communications interface. The second communications network may be a cellular communications network.

The first and/or second threshold may be varied as a function of the rate of the plurality of fault-indicative events per unit time and of a property of the network node. The property of the network node may relate to the length of the DSL, a line attenuation of the DSL, and/or a Signal to Noise Ratio of the DSL.

Each fault-indicative event of the plurality of fault-indicative events may be a loss of service, a retrain, a threshold elapsed time between retrains, a threshold mean time between retrains, a threshold count of errored seconds, a threshold count of severely errored seconds, or a threshold synchronization speed.

The network node may be a Customer Premises Equipment, CPE, and the first and second communications networks may be access networks.

According to a second aspect of the disclosure, there is provided a computer program comprising instructions which, when the program is executed by a computer, cause the computer to carry out the method of the first aspect of the disclosure. The computer program may be stored on a computer-readable data carrier.

According to a third aspect of the disclosure, there is provided a network node comprising a first communications interface for communicating with a first communications network and a second communications interface for communicating with a second communications network, memory for storing data relating to the first communications network, and a processor adapted to perform the method of the first aspect of the disclosure.

BRIEF DESCRIPTION OF THE DRAWINGS

In order that the present disclosure may be better understood, embodiments thereof will now be described, by way of example only, with reference to the accompanying drawings in which.

DETAILED DESCRIPTION OF THE EMBODIMENTS

Figure 1:
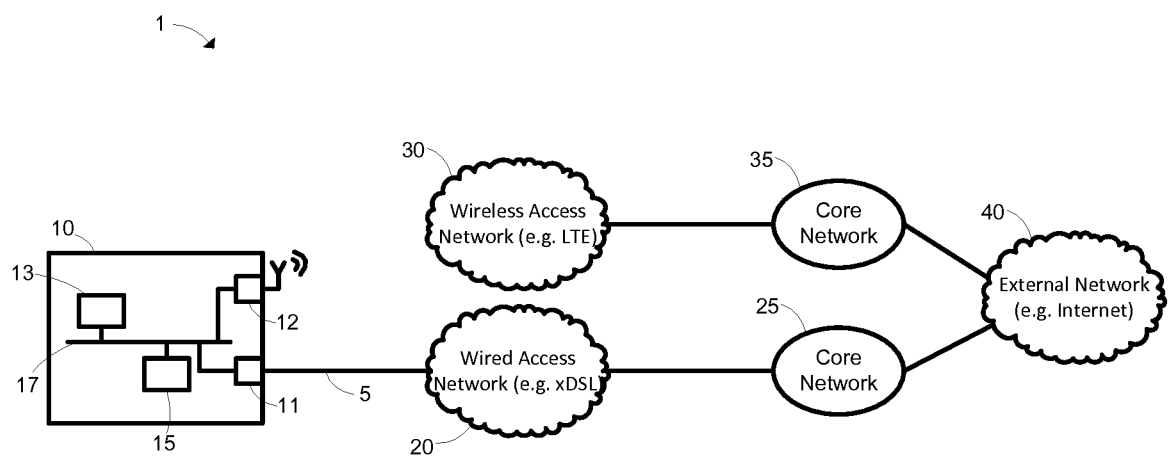
FIG. 1 is a schematic diagram of an embodiment of a telecommunications network of the present disclosure.

An embodiment of a telecommunications network 1 of the present disclosure will now be described with reference to FIG. 1. The network 1 includes a Customer Premises Equipment (CPE) 10, a wired access network 20 associated with a first core network 25, a wireless access network 30 associated with a second core network 35, and an external network 40. In this embodiment, the CPE 10 communicates with the wired access network 20 over a Digital Subscriber Line (DSL) 5, such that both the CPE 10 and wired access network 20 include DSL transceiver units (e.g. configured for data communications via any one of the xDSL protocols, such as ADSL, VDSL or G.fast). The CPE 10 is also configured to communicate with the wireless access network 30 via a cellular data connection, such that both the CPE 10 and wireless access networks include cellular transceivers (e.g. configured for data communications via any suitable cellular communication protocol, such as the 4$^{th}$ Generation (4G) Long Term Evolution (LTE) protocol).

The CPE 10 is configured to establish a data connection with either the wired or wireless access networks in order to communicate with the associated core network and/or to external networks (e.g. the Internet). In this embodiment, the CPE 10 has a default connection via the wired access network 20, and the connection via the wireless access network 30 is used as a backup in the event of a fault between the CPE 10 and wired access network 20. This switch is known as a "failover", and will be discussed in more detail below.

FIG. 1 illustrates the constituent parts of the CPE 10, including the DSL transceiver 11, the cellular transceiver 12, the processor 13, and memory 15, all connected via bus 17. The processor 13 implements a DSL monitoring function in order to monitor the performance of the DSL connection between the CPE 10 and wired access network 20, which, in this embodiment, includes monitoring events indicative of abnormal operation, such as a retrain event, an errored second, or a severely errored second. The DSL monitoring function detects the occurrence of each event, and keeps a count of the number of occurrences of each event (for all forms of monitored events) occurring within a 15-minute period. The value of the count for each form of monitored event in the 15-minute period is stored in memory 15 (which is often known as a "15-minute bin"). The DSL monitoring function performs these monitoring and recording steps sequentially, such that it then continues to count the number of occurrences of each event (for all forms of monitored events) in the next 15-minute period, which are then also stored in memory 15, and so on. The CPE 10 stores these counts for all 15-minute periods for the last 24 hours, and any old data is deleted and/or overwritten with new data. In this embodiment, the processor 13 is also able to derive further metrics based on the recorded data, such as a mean-time between retrains or the rate of retrains in each 15-minute bin, and to extrapolate the metrics to different time bases, such as the count of retrains occurring in the last 24 hour period, based on data from several 15-minute bins.

Figure 2:
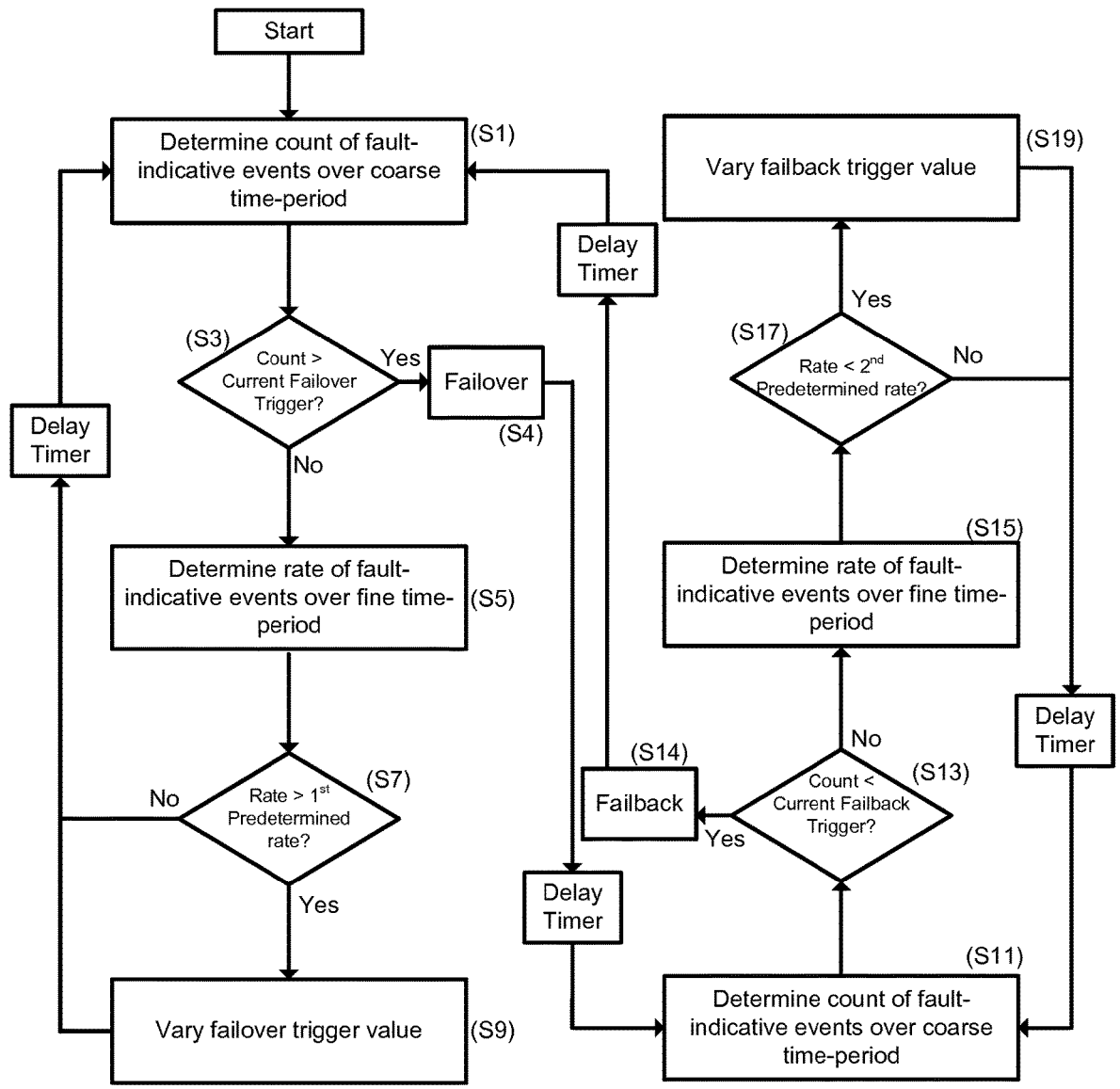
FIG. 2 is a flow diagram illustrating a first embodiment of a method of the present disclosure.

A first embodiment of a method of the present disclosure will now be described. In a starting scenario for this embodiment, the CPE 10 connects to the wired access network 20 and the DSL monitoring function of processor 13 starts to monitor the DSL connection and record the results in memory 15. The CPE 10 is configured to trigger a failover (from the wired access network to the wireless access network) if the count of retrains in the last 24-hours exceeds a threshold value, which is initially set at 10 retrains in the last 24-hours. However, as will be discussed below, the CPE 10 is also able to vary this threshold (hereinafter, the "failover trigger threshold") if the rate of the retrains in a 15-minute bin exceeds a predetermined rate. This method will now be described in more detail with reference to FIG. 2, which illustrates a first sub-process (S1 to S9) and a second sub-process (S11 to S19).

In S1 of the first sub-process, the processor 13 queries memory 15 to determine the count of retrains in the last 24-hours and, in S3, determine whether this count exceeds the initial threshold value of 10 retrains. This is achieved by summing the counts of retrains in each 15-minute bin over the last 24-hours. In this first iteration, the count is 0 (zero) and the method proceeds to S5. In S5, the processor 13 queries memory 15 to determine the rate of retrains in the most recent 15-minute bin. As no retrains have occurred, then the present rate of retrains is also 0 (zero). In S7, the processor 13 determines if this rate is greater than a predetermined rate for lowering the failover trigger threshold, which in this example the rate is set at 2 retrains per 15 minutes. In this first iteration, this determination is negative and the method loops back to S1 via a delay timer.

In the second iteration of S1, the processor 13 determines that the count of retrains in the last 24-hours is now 3 retrains. This is still less than the failover trigger threshold, and the method proceeds to S5. In the second iteration of S5, the processor 13 determines the rate of retrains in the most recent 15-minute bin. As 3 retrains recently occurred, then the rate is 3 retrains per 15 minutes for the most recent 15-minute bin. In S7, the processor 13 determines if this rate is greater than the predetermined rate of 2 retrains per 15 minutes. As this determination is positive, the method proceeds to S9 in which the processor 13 reduces the failover trigger threshold. In this embodiment, the processor 13 is configured to reduce the failover trigger threshold by 50%

(wherein any non-whole number is truncated) upon each positive determination of a rate of retrains in a 15-minute bin exceeding the predetermined rate, such that the new failover trigger threshold is 5. The method then loops back to S1 via the delay timer.

In the third iteration, the processor 13 queries memory 15 to determine if the count of retrains in the last 24-hours exceeds the new failover trigger threshold. In this example, the count of retrains in the last 24-hours is now 7, which is greater than the (new) failover trigger threshold. A failover is therefore triggered (S4) and the CPE 10 connects to the wireless access network via cellular transceiver 12, which is thereafter used for communicating with the cellular core network 35 and the external network 40.

Following the failover, the CPE 10 maintains the wired access network connection and the DSL monitoring function continues to monitor its performance in order to identify a suitable time to use it as the sole connection again (i.e. to disconnect the connection with the wireless access network), which is hereinafter called a "failback". In broad terms, this failback occurs when the count of retrains in the last 24-hours drops below the failback trigger threshold (which, initially, is set to 6 retrains in a 24-hour period), but this may also be varied if the rate of retrains in a 15-minute bin is less than a predetermined rate. This is illustrated in a second sub-process of FIG. 2, in which the processor 13 (in S11) queries memory 15 to determine the count of retrains in the last 24-hours and, in S13, determines whether this count is less than the initial failback trigger threshold. This could be triggered, for example, if any of the retrain events that contributed to the count of retrains that previously exceeded the failover trigger threshold (in S3) were now, by virtue of the delay timer, outside the 24-hour period such that the count of retrains in the last 24-hours was less than the failback trigger threshold. In this example, however, the count has increased to 10 following 3 retrain events in the last 15-minutes, such that the determination of S13 is negative. The method therefore proceeds to S15.

In S15, the processor 13 determines the rate of retrains in the most recent 15-minute bin. In this example, this is determined to be 3 retrains per 15 minutes. In S17, the processor 13 determines if this rate is less than a second predetermined rate, which in this example is also set to 2 retrains per 15 minutes, such that this determination is negative in this iteration. The method then loops back to S11 via a delay timer.

In the second iteration of S11 and S13, the processor 13 again queries memory 15 to determine if the count of retrains in the last 24-hours is less than the failback trigger threshold. The count of retrains is now 11, and the determination is again negative. The method proceeds to a second iteration of S15, in which the processor 13 determines the rate of retrains in the most recent 15-minute bin. As a single retrain event occurred in the last 15-minute bin, then this rate of retrains is 1 retrain per 15-minutes. In S17, the processor 13 determines if this rate is less than the second predetermined rate, which is now positive. The method therefore proceeds to S19 in which the failback trigger threshold is increased. In this embodiment, the failback trigger threshold is increased by 50% (wherein any non-whole number is truncated), such that, in this example, the new failback trigger threshold is now 9. The method then loops back to S11.

In the third iteration of S11 and S13, the processor 13 again queries memory 15 to determine if the count of retrains in the last 24-hours is less than the new failback trigger threshold. The count of retrains remains at 11, and the processor 13 determines that the count is still greater than the failback trigger threshold. In the third iteration of S15 to S19, the processor 13 determines that the current rate of retrains is now 0, which is less than the second predetermined rate, and the failback trigger threshold is increased to 13. The method again loops back to S11.

In the fourth iteration of S11 and S13, the processor again queries memory 15 to determine if the count of retrains in the last 24-hours is less than the new failback trigger threshold. In this example, the count of retrains has increased to 12, and the processor 13 determines that the count is now less than the new failback trigger threshold of 13. Accordingly, a failback is triggered (S14) and the CPE 10 disconnects from the wireless access network. The CPE 10 now only maintains the wired access network, through which it communicates with the DSL core network 25 and the external network 40.

Following the failback, the CPE 10 continues to monitor the DSL connection (via the DSL monitoring function) to determine if another failover should be initiated via the first sub-process. In this example, the relevant trigger thresholds (for failover and failback) are reset to their initial values each time a failover or failback occurs.

Figure 3:
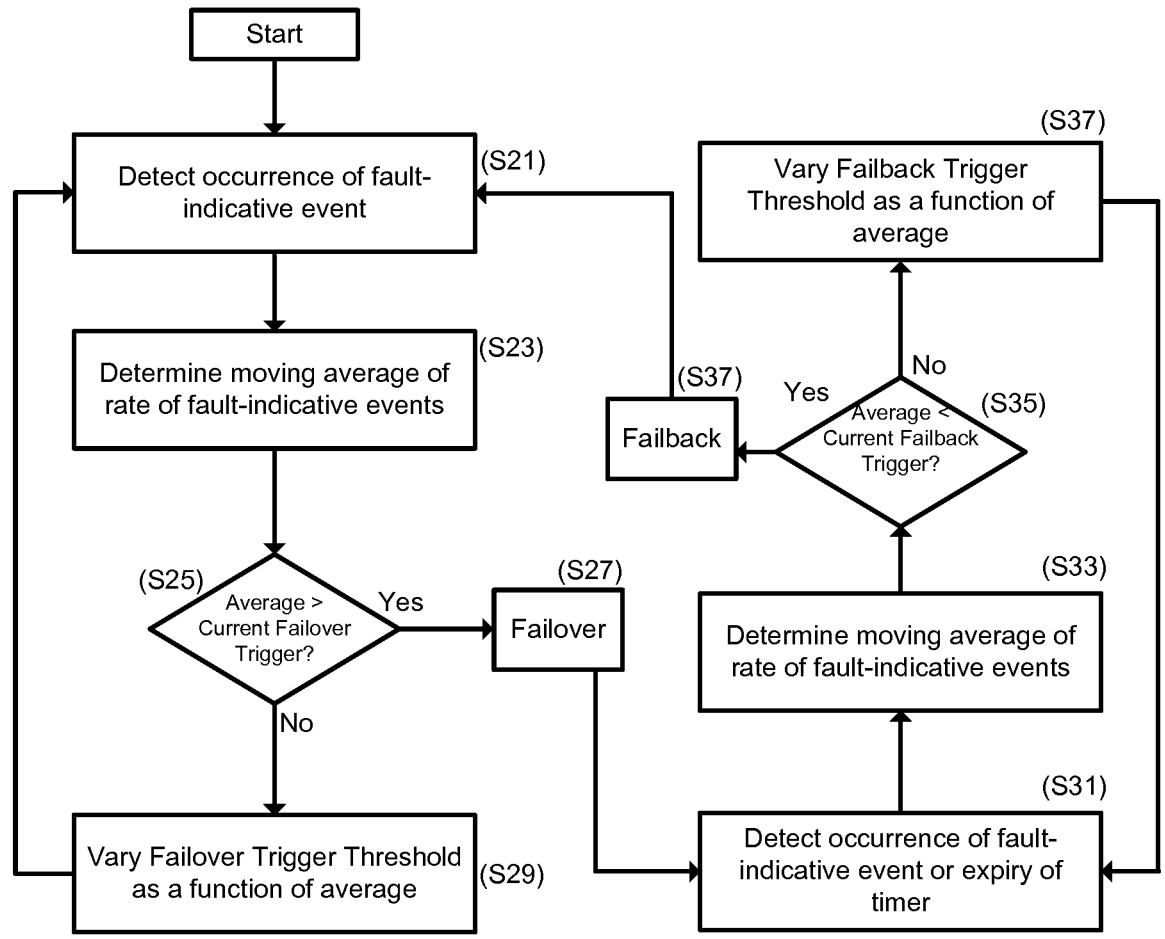
FIG. 3 is a flow diagram illustrating a second embodiment of a method of the present disclosure.

A second embodiment of a method of the present disclosure will now be described with reference to FIG. 3. This embodiment utilizes the same network as the first embodiment, but differs in that the process is executed upon each occurrence of a fault-indicative event (rather than keeping a running count of each fault-indicative event and executing the process upon expiry of a timer, as in the first embodiment). Accordingly, in S21, the processor 13 monitors the first communications interface to detect the occurrence of a retrain event (which is thereafter recorded in memory with a timestamp). In response to this detection, in S23, the processor 13 determines a moving average of the rate of retrains which, in this example, is based on the last-5 retrain events. Accordingly, the processor 13 identifies the last-5 retrain events and their timestamps (from memory), including the recently detected retrain event, and calculates the corresponding average rate of retrain events for these 5 retrain events.

In S25, the processor 13 determines if this moving average rate is greater than a failover trigger threshold. If so, then the failover is triggered (S27). If not, then the method proceeds to S29 and the failover trigger threshold is varied as a function of the calculated moving average. In this embodiment, the function includes a weighting such that the failover trigger threshold variation is dependent on the length of the intervals between retrain events. The method is then repeated, using the new failover trigger threshold, upon a subsequent detection of another retrain event (such that a new moving average is calculated and compared to the new failover trigger threshold).

If the failover trigger threshold was satisfied in S27, then the CPE 10 starts using the cellular network to access the core and external networks, but continues to monitor the DSL network to identify a suitable time for failback. In this embodiment, in S31, the processor 13 monitors the first communications interface to detect the occurrence of a retrain event or the expiry of a timer (e.g. 24 hours). Upon either condition being satisfied, the processor 13 determines (in S33) a moving average of the rate of retrains based on the last-5 retrain events (however, if the process was triggered following expiry of the timer, then this is considered an "event" for the purposes of this determination to avoid the CPE 10 remaining in the failover state if no retrain events subsequently occur). In S35, the processor 13 determines if this moving average satisfies a failback trigger threshold. If so, then a failback is triggered (S37). If not, then the processor 13 varies the failback trigger threshold as a function of the calculated moving average. The method is then repeated, using the new failback trigger threshold, upon a subsequent detection of another retrain event or expiry of the timer.

In an enhancement to the above processes, the CPE 10 may vary the failover and/or failback trigger thresholds as a function of both the rate of retrains per unit time and another parameter. For example, the CPE 10 may vary the failover and/or failback trigger threshold based on the rate of retrains per unit time and based on the length of the DSL (the length of the physical connection between the respective transceiver units of the CPE and access node), such that the failover trigger threshold may be decreased by a relatively greater amount for relatively shorter DSLs (and vice versa) and such that the failback trigger threshold may be increased by a relatively greater amount for relatively shorter DSLs (and vice versa). Additionally or alternatively, the CPE 10 may vary the failover and/or failback trigger threshold based on the rate of retrains per unit time and based on the attenuation of the DSL, the performance of the backup network (or relative performance), the Signal to Noise Ratio of the DSL, and/or the access technology being used (ADSL, VDSL, G.fast).

In the above embodiments, the CPE monitors retrain events to determine if a failover or failback should occur. However, the skilled person will understand that the present invention is not limited to monitoring retrain events but may instead monitor any form of fault-indicative event (e.g. a count of errored seconds or severely errored seconds in a time period exceeding a threshold). Furthermore, the present invention is not limited to CPEs determining whether to switch between a wired and wireless access network, as the invention may also be applied to CPEs switching between any two forms of access network. The present disclosure may also be applied to network nodes other than CPEs that may switch between any two networks for accessing services (especially when the two networks are owned by different operators, use different communications infrastructure, use different communications media, and/or have different Qualities of Service such as different usage caps, bandwidth and charging models).

In the above embodiments, the CPE maintains the connection to the first communications network following the failover. This is advantageous as the CPE may then select an appropriate time to failback by continued monitoring of the first communications network and determining whether the failback trigger threshold has been met. The skilled person will also understand that this may involve the CPE sending and receiving data using the first communications network such that the analysis is reflective of the situation following failback. However, the skilled person will understand that this aspect of the disclosure is non-essential, and advantages of the disclosure may still be realized by using the rate-adaptive failover alone. Furthermore, the skilled person will understand that it is less important whether the CPE maintains the connection to either the first or second communications network, but whether the CPE uses the connection to access services (such as access to core network services or to access external networks). Thus, following a failover, the CPE may maintain the connection to the first communications network whilst it connects to the second communications network, but it will thereafter access services on or via the second communications network; and, following a failback, the CPE may maintain the connection to the second communications network, but it will thereafter access services on or via the first communications network.

Furthermore, the skilled person would understand that the particular values used in the above embodiments (e.g. for the failover trigger, the failback trigger, and the first and second predetermined rates for varying the failover and failback triggers) are examples only. That is, failover and failback may be triggered by a metric other than a count of fault-indicative events, such as an average number of fault-indicative events in the last 24-hours. Furthermore, the event initiating a variation in the failover and failback trigger thresholds respectively may be a function based on a time derivative other than 15-minutes, such as every 1-minute or 1-hour. The CPE 10 may therefore be configured for monitoring the DSL connection such that it may record the occurrences of fault-indicative events with sufficient accuracy (e.g. by associating each event with a timestamp) such that the rate of fault-indicative events per any unit of time may be determined. In general terms, embodiments of the invention may trigger a failover and/or failback based on the analysis of fault-indicative events at a relatively coarse timescale, whilst the thresholds used in the failover and/or failback triggering analysis may be varied based on the analysis of fault-indicate events at a relatively fine timescale.

The skilled person will also understand that a node other than the CPE may be configured to perform the analysis to determine if a failover or failback should occur, and then send a message to the CPE to initiate the failover or failback.

In the above embodiments, the CPE has a first communications interface connectable to a first communications network and a second communications interface connectable to a second communications network. The skilled person will understand that these two interfaces may be part of the same communications module or part of distinct communications modules.

The skilled person will understand that any combination of features is permissible within the scope of the invention, as claimed.

The invention claimed is:

1. A method of operating a network node having a first communications interface connectable to a first communications network and a second communications interface connectable to a second communications network, the method comprising:

the network node accessing a service using the first communications network;

analyzing data relating to the first communications network to identify a plurality of fault-indicative events;

determining a rate of the plurality of fault-indicative events per unit time; and the network node accessing the service using the second communications network in response to a first trigger, wherein the first trigger is varied as a function of the rate of the plurality of fault-indicative events per unit time.

2. The method as claimed in claim 1, further comprising:

determining a first count of the plurality of fault-indicative events in a first time period;

wherein the first trigger for the network node accessing the service using the second communications network is the first count of the plurality of fault-indicative events in the first time period satisfying a first threshold, wherein the first threshold is varied as a first function of the rate of the plurality of fault-indicative events per unit time.

3. The method as claimed in claim 1, further comprising:
following the network node accessing the service using the second communications network, the network node accessing the service using the first communications network in response to a second trigger, wherein the second trigger is varied as a function of the rate of the plurality of fault-indicative events per unit time.

4. The method as claimed in claim 3, further comprising:
determining a second count of the plurality of fault-indicative events in a second time period,
wherein the second trigger for the network node accessing the service using the first communications network is the second count of the plurality of fault-indicative events satisfying a second threshold, wherein the second threshold is varied as a second function of the rate of the plurality of fault-indicative events per unit time.

5. The method as claimed in claim 4, wherein the network node accessing the service using the second communications network is in response to the first count of the plurality of fault-indicative events in the first time period being greater than the first threshold and the network node accessing the service using the first communications network is in response to the second count of the plurality of fault-indicative events in the second time period being less than the second threshold.

6. The method as claimed in claim 3, further comprising:
determining a time between a subset of the plurality of fault-indicative events;
wherein at least one of the first trigger or the second trigger for the network node accessing the service using the second communications network is a time between the subset of the plurality of fault-indicative events satisfying a first or second threshold respectively, wherein at least one of the first threshold or the second threshold are varied as a first function of the rate of the plurality of fault-indicative events per unit time.

7. The method as claimed in claim 1, wherein the first communications network is a Digital Subscriber Line (DSL) access network, and the one or more communications interfaces includes a DSL communications interface.

8. The method as claimed in claim 7, wherein at least one of the first threshold or the second threshold is varied as a function of the rate of the plurality of fault-indicative events per unit time and of a property of the network node.

9. The method as claimed in claim 7, wherein each fault-indicative event of the plurality of fault-indicative events is one of a group comprising: a loss of service, a loss of a physical layer, a loss of a logical layer, a retrain, a threshold elapsed time between retrains, a threshold mean time between retrains, a threshold count of errored seconds, a threshold count of severely errored seconds, and a threshold synchronization speed.

10. The method as claimed in claim 1, wherein the second communications network is a cellular communications network.

11. The method as claimed in claim 1, wherein the network node is a Customer Premises Equipment (CPE).

12. The method as claimed in claim 1, wherein the first communications network and the second communications network are access networks.

13. A system comprising:
a processor and memory configured to operate a network node having a first communications interface connectable to a first communications network and a second communications interface connectable to a second communications network, by:
causing the network node to access a service using the first communications network;
analyzing data relating to the first communications network to identify a plurality of fault-indicative events;
determining a rate of the plurality of fault-indicative events per unit time; and
causing the network node to access the service using the second communications network in response to a first trigger, wherein the first trigger is varied as a function of the rate of the plurality of fault-indicative events per unit time.

14. A non-transitory computer-readable data carrier having stored thereon a computer program comprising instructions which, when the computer program is executed by a computer, cause the computer to carry out the method of claim 1.

15. A network node comprising a first communications interface for communicating with a first communications network and a second communications interface for communicating with a second communications network, memory for storing data relating to the first communications network, and a processor adapted to perform the method of claim 1.

* * * * *